(12) United States Patent
Peters (10) Patent No.: US 10,821,765 B2
(45) Date of Patent: Nov. 3, 2020

(54) SECURE DOCUMENTS AND METHODS OF MANUFACTURING THE SAME

(71) Applicant: ASSA ABLOY AB, Stockholm (SE)

(72) Inventor: Eric MacKenzie Peters, Fremont, CA (US)

(73) Assignee: ASSA ABLOY AB, Stockholm (SE)

(*) Notice: Subject to any disclaimer, the term of this patent is extended or adjusted under 35 U.S.C. 154(b) by 240 days.

(21) Appl. No.: 15/867,535

(22) Filed: Jan. 10, 2018

(65) Prior Publication Data

US 2019/0210396 A1 Jul. 11, 2019

(51) Int. Cl.

| | |
|---|---|
| B42D 25/373 | (2014.01) |
| B41M 3/14 | (2006.01) |
| B42D 25/378 | (2014.01) |
| B42D 25/425 | (2014.01) |
| B42D 25/328 | (2014.01) |
| B42D 25/351 | (2014.01) |
| C09D 11/322 | (2014.01) |
| C09D 11/037 | (2014.01) |
| C09D 11/101 | (2014.01) |
| B41J 2/01 | (2006.01) |

(Continued)

(52) U.S. Cl.
CPC .............. *B42D 25/373* (2014.10); *B41J 2/01* (2013.01); *B41M 3/148* (2013.01); *B42D 25/378* (2014.10); *B42D 25/425* (2014.10); *C09D 11/037* (2013.01); *C09D 11/101* (2013.01); *C09D 11/322* (2013.01); *B42D 25/328* (2014.10); *B42D 25/351* (2014.10); *C08K 5/0091* (2013.01); *C08K 2003/0831* (2013.01); *C08K 2201/011* (2013.01)

(58) Field of Classification Search
CPC .. B42D 25/373; B42D 25/378; B42D 25/425; B42D 25/328; B42D 25/351; B41J 2/01; B41M 3/148; C09D 11/037; C09D 11/101; C09D 11/322
See application file for complete search history.

(56) References Cited

U.S. PATENT DOCUMENTS

| | | |
|---|---|---|
| 5,786,910 A | 7/1998 | Walters et al. |
| 6,082,778 A | 7/2000 | Solmsdorf |

(Continued)

FOREIGN PATENT DOCUMENTS

| | | |
|---|---|---|
| DE | 102008008685 | 8/2009 |
| DE | 102010017429 | 12/2011 |

(Continued)

OTHER PUBLICATIONS

"U.S. Appl. No. 15/867,554, Final Office Action dated Jul. 12, 2019", 10 pgs.

(Continued)

*Primary Examiner* — Laura C Powers
(74) *Attorney, Agent, or Firm* — Schwegman Lundberg & Woessner, P.A.

(57) ABSTRACT

A security feature, a document including a security feature, and a method of producing a document are provided. In one example a security document is disclosed to include a substrate having a micro-replicated lacquer applied to a first side of the substrate and a metal complex ink applied to the first side of the substrate thereby covering the micro-replicated lacquer applied to the first side of the substrate.

20 Claims, 5 Drawing Sheets

(51) Int. Cl.
*C08K 3/08* (2006.01)
*C08K 5/00* (2006.01)

(56) References Cited

U.S. PATENT DOCUMENTS

| | | |
|---|---|---|
| 7,758,078 B2 | 7/2010 | Keller |
| 7,955,528 B2 | 6/2011 | Chung et al. |
| 8,314,828 B2 | 11/2012 | Bombay et al. |
| 9,266,350 B2 | 2/2016 | Lazzari et al. |
| 10,350,935 B1 | 7/2019 | Peters |
| 2004/0166336 A1 | 8/2004 | Lindvold et al. |
| 2006/0119912 A1 | 6/2006 | Kutsch et al. |
| 2007/0070503 A1 | 3/2007 | Boswell et al. |
| 2007/0183045 A1 | 8/2007 | Schilling et al. |
| 2007/0190298 A1* | 8/2007 | Hampden-Smith ........... B42D 25/373 428/204 |
| 2009/0284813 A1 | 11/2009 | Saito |
| 2010/0181754 A1 | 7/2010 | Labrec |
| 2010/0320742 A1 | 12/2010 | Hoffmuller et al. |
| 2011/0239886 A1* | 10/2011 | Holmes ................ B42D 25/405 101/483 |
| 2014/0319819 A1* | 10/2014 | Power .................. C09D 11/037 283/85 |
| 2015/0069748 A1 | 3/2015 | Batistatos et al. |
| 2017/0197452 A1 | 7/2017 | Philippe et al. |
| 2017/0326900 A1 | 11/2017 | Fuhse et al. |
| 2018/0239070 A1 | 8/2018 | England et al. |
| 2019/0210397 A1 | 7/2019 | Peters |
| 2019/0210398 A1 | 7/2019 | Peters |

FOREIGN PATENT DOCUMENTS

| | | |
|---|---|---|
| EP | 1110660 | 6/2001 |
| EP | 1150843 | 7/2004 |
| EP | 1728770 | 12/2006 |
| EP | 2441593 | 4/2012 |
| JP | 2009251357 | 10/2009 |
| JP | 2015147373 | 8/2015 |
| JP | 2016065180 | 4/2016 |
| WO | WO 2005/049745 | 6/2005 |
| WO | 2006076616 | 7/2006 |
| WO | 2012176126 | 12/2012 |
| WO | 2013186167 | 12/2013 |
| WO | WO 2015/189393 | 12/2015 |
| WO | 2016092044 | 6/2016 |
| WO | WO 2016/096681 | 6/2016 |
| WO | 2016147481 | 9/2016 |
| WO | WO 2017/207420 | 12/2017 |
| WO | 2019138264 | 7/2019 |
| WO | 2019138265 | 7/2019 |

OTHER PUBLICATIONS

"U.S. Appl. No. 15/867,554, Response filed May 21, 2019 to Non Final Office Action dated Jan. 29, 2019", 11 pgs.
"U.S. Appl. No. 15 867,554, Non Final Office Action dated Jan. 29, 2019", 9 pgs.
"International Application Serial No. PCT IB2018 001457, International Search Report dated Mar. 29, 2019", 6 pgs.
"U.S. Appl. No. 15/867,567, PTO Response to Rule 312 Communication dated May 17, 2019", 1 pg.
"U.S. Appl. No. 15 867,567, Non Final Office Action dated Oct. 18, 2018", 9 pgs.
"U.S. Appl. No. 15/867,567, Response filed Jan. 18, 2019 to Non Final Office Action dated Oct. 18, 2018", 9 pgs.
"U.S. Appl. No. 15/867,567, Notice of Allowance dated Mar. 15, 2019", 8 pgs.
"International Application Serial No. PCT IB2018 001458, International Search Report dated Mar. 19, 2019", 6 pgs.
"International Application Serial No. PCT IB2018 001458, Written Opinion dated Mar. 19, 2019", 6 pgs.
"International Application Serial No. PCT IB2018 001457, Written Opinion dated Mar. 29, 2019", 6 pgs.
"U.S. Appl. No. 15/867,567, 312 Amendment filed Apr. 18, 2019", 7 pgs.
"U.S. Appl. No. 15/867,567, Examiner Interview Summary dated May 6, 2019", 3 pgs.
"U.S. Appl. No. 15/867,554, Restriction Requirement dated Nov. 2, 2018", 6 pgs.
"U.S. Appl. No. 15/867,554, Response filed Jan. 2, 2019 to Restriction Requirement dated Nov. 2, 2018", 1 pg.
International Search Report and Written Opinion for International (PCT) Patent Application No. PCT/EP2017/062724, dated Aug. 18, 2017, 15 pages.

\* cited by examiner

SECURE DOCUMENTS AND METHODS OF MANUFACTURING THE SAME

FIELD

The present disclosure is generally directed to security features, security documents incorporating security features, and methods of manufacturing the same.

BACKGROUND

The use of identification documents and other credentials is pervasive. Credentials are used on a daily basis for a number of different purposes. Credentials, which may also be referred to as secure documents, are most commonly used to prove identity, to verify age, to access an asset (e.g., secure area, financial account, computing resource, etc.), to evidence driving privileges, to cash a check, and so on. Airplane passengers are required to show a credential during check in, and sometimes at security screening and prior to boarding their flight. We also live in an ever-evolving cashless society where credentials are used to make payments, access an automated teller machine (ATM), debit an account, or make a payment, etc. Many industries require that their employees carry photo identification credentials on the job and to access various locations on a job site.

While many different types of security features have been developed to enhance the security associated with credentials, optically variable or holographic security features have been among the most popular features developed in the last decade thanks to their difficulty to copy and the ease with which they can be verified. The diffractive effects of surface relief structures is known, however traditional methods of producing diffractive effects are inefficient in most cases.

SUMMARY

Embodiments of the present disclosure aim to overcome the shortcomings described above. In some embodiments, a credential manufacturing process can begin when a roll of material (e.g., a Polycarbonate (PC)) substrate is received having micro replicated lacquer applied thereto. The microreplicated liquid lacquer may be cross-linked using any type of known curing techniques (e.g., Ultraviolet (UV) light, Infrared (IR) light, heat, chemical, e-beam etc.). Thereafter, a metal complex ink is applied to the PC substrate having the micro replicated lacquer applied thereto. The metal complex ink can be applied with any type of known or yet to be developed inkjet print head, including standard commercial inkjet print heads. The metal complex is then quickly cured (e.g., within 1-10 seconds of application of the ink) such that the dried metal complex has a mirror-like finish. Curing can be achieved by application of hot air and/or UV radiation with little solvent emission. The cured metal complex will have a thickness between 0.3 and 5 microns. At this point the PC substrate, which may be between 50-75 microns thick, has a thin metal complex structure cured on top of it.

The substrate having its thin metal complex structure can then be laminated with other PC structures into a card format. These additional layers may be printed or not, with or without chips, etc. Some of these layers may be laserable or otherwise be configured for personalization.

The metal complex may be a metal complex ink having any type of metal complexes therein (e.g., silver, copper, gold, etc.) that is applied through inkjet printing heads in bands up to 65 mm wide. The inkjet printing heads may have a resolution of 200 dbi, 400 dbi, 800 dbi or any other suitable resolution that enables a smooth application of the chosen metal complex ink. As an alternative to metal complex ink, a nanoparticle silver ink may be used. Ideally, a metal complex ink should be chosen that works well with the selected substrate material. For example, it may be desirable to use a metal complex ink having a lower curing temperature than the PC substrate so that the ink can cure without disrupting the substrate. Selections of different substrate materials may also be useful. For instance, a higher softening temperature PC copolymer or PC copolymer/PC blend may be ideal, but other types of PC substrates may be used as well.

After the metal complex structure is cured on top of the PC substrate, additional types of PC layers may be applied to the substrate. These layers may have windows or other known types of features. The metal complex surface finish can vary (gloss to matte) and can be different when viewed on opposite sides. The additional PC layers may be laminated to the PC substrate to form the desired layers of a secure document. At this point, the layers are still in a roll format.

One or more high-quality images may be laser-engraved into the outermost PC layer(s). This may correspond to a card personalization step. Engraving may occur before or after lamination. The rolls material may then be cut/singulated to create multiple documents (e.g., cards, passports, printed IDs, RFIDs, etc.).

The above-described concepts can be further extended by using two different types of metal complexes on the same PC substrate. The different metal complexes may be applied to the PC substrate substantially simultaneously with different print heads. If the materials are applied to the PC substrate at substantially the same time (e.g., within a few seconds of one another), then both materials can be cured with the same curing process.

For the purposes of this disclosure, credentials are broadly defined and may include, for example, credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments or documentation, security clearance badges and cards, gun permits, gift certificates or cards, labels or product packaging, membership cards or badges, etc. Also, the terms "document," "credential," "card," and "documentation" are used interchangeably throughout this document. Credentials are also sometimes interchangeably referred to as "security documents," "ID documents," "identification documents," "security credentials," "photo-IDs," and "photo ID documents".

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

According to one embodiment of the present disclosure, a method of manufacturing a secure document is provided, comprising:

receiving a substrate in a roll format having an micro-replication lacquer applied to a first side of the substrate;

applying a metal complex ink to the first side of the substrate thereby covering the micro-replication lacquer applied to the first side of the substrate; and curing the metal complex ink within a predetermined amount of time of applying the metal complex ink to the first side of the substrate.

In some embodiments, the method further comprises: applying a second layer to a second side of the substrate that opposes the first side of the substrate; covering the metal complex ink with a third layer thereby sandwiching the substrate between the second layer and the third layer; and laminating the substrate, second layer, and third layer.

In some embodiments, the metal complex ink comprises a higher melting temperature than the substrate, the second layer, and the third layer.

In some embodiments, the metal complex ink comprises a lower curing temperature than the substrate, the second layer, and the third layer.

In some embodiments, the substrate comprises polycarbonate.

In some embodiments, the metal complex ink comprises metal particles having a diameter of no more than 10 nanometers.

In some embodiments, the metal complex ink comprises a thickness of no more than 4 microns and the metal complex ink is cured to create a mirror-like finish.

In some embodiments, applying the metal complex ink to the first side of the substrate comprises printing the metal complex ink onto the first side of the substrate using one or more inkjet print heads.

In some embodiments the method further comprises applying a second metal complex ink to the first side of the substrate, wherein the second metal complex ink is applied at substantially the same time as the metal complex ink.

In some embodiments, the second metal complex ink comprises a different material than is provided in the metal complex ink. In some embodiments the method further comprises curing the second metal complex ink at substantially the same time as the metal complex ink. In some embodiments, the second metal complex ink is applied adjacent to the metal complex ink. In some embodiments, the metal complex ink is applied with a first inkjet print head and the second metal complex ink is applied with a second inkjet print head.

In some embodiments, the metal complex ink is cured by exposure to at least one of Ultraviolet (UV) light and Infrared (IR) light.

In some embodiments the method further comprises providing at least one electronic component over the substrate; covering the at least one electronic component with an additional layer of polycarbonate; and laminating the additional layer of the polycarbonate to the substrate thereby fixing a position of the at least one electronic component between the substrate and the additional layer of polycarbonate.

Figure 1:
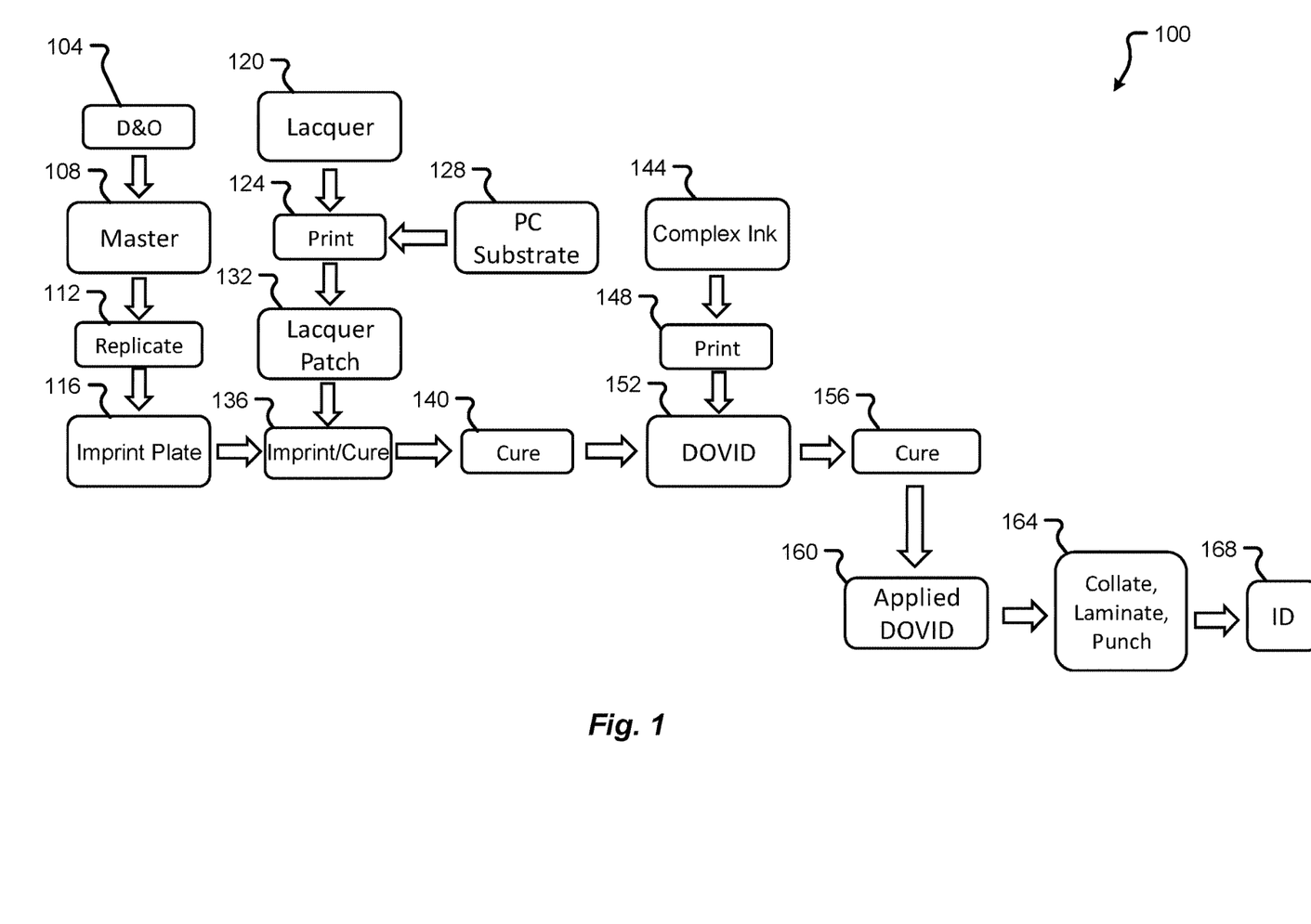
FIG. 1 is a flow diagram depicting a method of manufacturing a secure document in accordance with at least some embodiments of the present disclosure.

With reference now to FIG. 1, additional details of a method 100 for manufacturing a secure document will be described in accordance with at least some embodiments of the present disclosure. The method 100 begins with a design and origination process (step 104). In this process, various design details for a security feature and/or security document having a security feature are contemplated. The design of the security feature and/or document is then incorporated into a master plate (step 108). This master plate is used to produce one or more replicas (step 112) in the form of transparent imprint plates (step 116). In some embodiments, where the security feature corresponds to a holographic feature, the imprint plates may correspond to holographic plates that can be used to replicate an optical structure during a micro-replication process.

The method 100 continues when a substrate, such as a polycarbonate (PC) substrate, is received (step 128) and has one or more layers of lacquer applied thereto (step 120) in a printing process (step 124). In some embodiments, the lacquer is applied to the PC substrate for a liquid lacquer patch (step 132) and a micro-replication process imprints into the liquid lacquer and crosslinks the lacquer (step 136). A non-limiting example of such a process corresponds to the Holoprint.RTM. process, details of which are provided in EP 1150843 B1 and/or U.S. Patent Publication No. 2004/0166336 to Lindvold et al., the entire contents of which are hereby incorporated herein by reference. The resulting product is a PC substrate having a micro replicated cured lacquer on at least one side thereof.

The lacquer may then be post cured in a second curing process (step 140). The lacquer may be cured using heat, light, or a combination thereof. This product may then have a metal complex ink (e.g., a silver complex ink) applied thereto (steps 144 and 148). In some embodiments, the metal complex ink is applied to the product using an inkjet print head (step 148). At this point, the metal complex ink overlies the micro-replication lacquer, thereby creating one or more holographic features on the substrate (step 152). In some embodiments, the resulting product can be referred to as a Diffractive Optically Variable Image Device (DOVID) or an intermediary product of a security document. The metal complex may be cured (step 156) using heat, light, or a combination thereof. In some embodiments, the metal complex applied to the substrate is cured within a predetermined amount of time of the metal complex ink being applied to the substrate. As a non-limiting example, the substrate may have the metal complex ink printed thereon and the metal complex ink may be cured within no more than ten seconds of application. This relatively short amount of time between metal complex ink application and curing helps to create an optically-appealing DOVID feature. Even more specifically, the DOVID feature may include a mirror-like finish that is interrupted only by the micro replicated lacquer. The combination of the micro replicated lacquer and metal complex ink applied thereto creates a DOVID feature on the substrate.

The resulting product may be referred to as an applied DOVID (step 160). In some embodiments, the holographic feature may only be provided on a portion of the substrate whereas other portions of the substrate do not have the holographic feature applied thereto. One or more additional layers may then be provided on the applied DOVID (step 164). Alternatively or additionally, electronic components (e.g., an Integrated Circuit (IC) chip, an antenna, electronic traces, etc.) may be provided on the applied DOVID. These additional layers and/or electronic components may be laminated via application of heat and/or pressure. In some embodiments, the metal complex ink comprises a higher melting temperature and/or lower curing temperature than the other layers (e.g., the substrate and additional layers) so that the lamination step does not melt, reflow, or otherwise cause the metal complex ink to undesirably alter in any way. If the substrate was provided in a sheet or web-based format such that a plurality of cards are manufactured on a single sheet, the method 100 may further include punching or singulating individual documents from the sheet or web. This results in the production of one or many secure documents, which may also be referred to as secure IDs (step 168).

Figure 2:
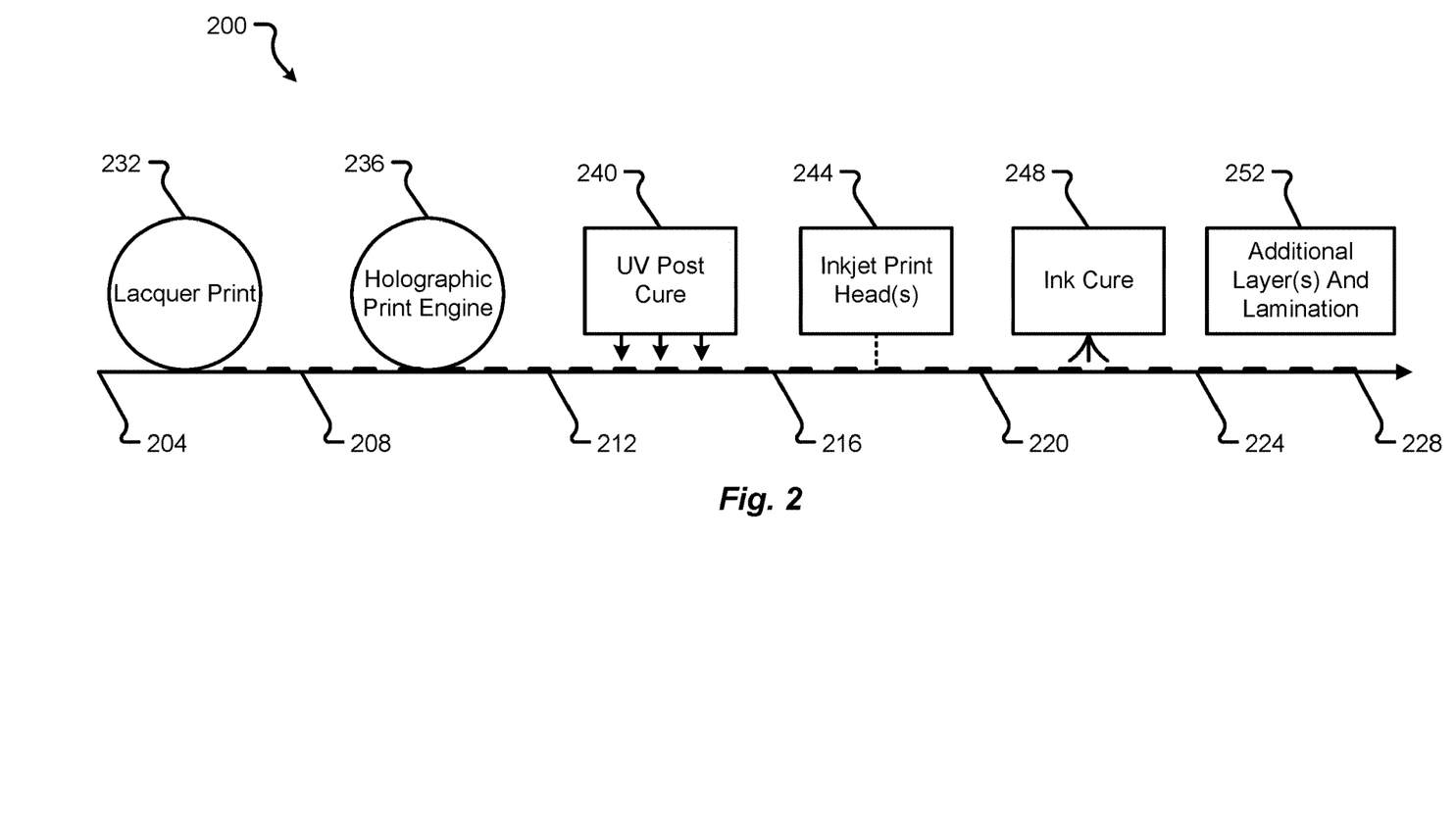
FIG. 2 is a diagram depicting components used to manufacture a secure document in accordance with at least some embodiments of the present disclosure.

With reference now to FIG. 2, additional details of the components 200 used to manufacture a secure document or a plurality of secure documents will be described in accordance with at least some embodiments of the present disclosure. In the depicted embodiment, a plurality of secure documents may be manufactured simultaneously from a sheet or web-based format of a substrate. In particular, embodiments of the present disclosure provide a method and system 200 for manufacturing a plurality of secure documents in-line, meaning that a single web-based substrate can be passed through a plurality of processes without the need for cutting the web-based substrate or otherwise manually moving a sheet of substrate from one machine to another.

As shown in FIG. 2, a roll of substrate 204 is fed to a lacquer printer 232. The lacquer printer may apply a first layer of lacquer to the substrate 204. The lacquer applied by the lacquer printer may further be micro replicated with an impression cylinder or the like. In some embodiments, a flexographic print roll is used to simultaneously apply a layer of lacquer to the web-based substrate (which may correspond to a polycarbonate sheet of material) and pattern that lacquer into the desired shape (e.g. square, oval, star etc.). At this point the web-based substrate now has a layer of lacquer 208, which can be provided to a holographic print engine 236. In some embodiments, the holographic print engine 236 is used to pattern and simultaneously cure the lacquer. The output of the holographic print engine 212 may then pass through an additional cure process 240. In some embodiments, UV light and/or heat is used to further cure the micro-replication lacquer and ensure that the patterns applied thereto by the holographic print engine 236 are totally cured and maintained.

The web-based substrate having the micro-replication and cured lacquer 216 is then passed under one or more inkjet print heads 244. The inkjet print heads 244, in some embodiments, may correspond to commercial inkjet printing heads configured to deliver a metal complex ink in bands up to 65 mm wide and at a resolution of 200 dbi, 400 dbi, 800 dbi or any other suitable resolution that enables a smooth application of the chosen metal complex ink onto the web-based substrate. In some embodiments, the metal complex ink may be applied to have a thickness between 1 and 5 microns.

The selection of the type of metal complex ink applied by the inkjet print head(s) 244 can depend upon the type of substrate being used and the desired effects of a security feature that will result from the application of the metal complex ink. Non-limiting types of metal complex inks that may be used include silver complex inks, copper complex inks, gold complex inks, etc. Even more specifically, the metal complex ink may correspond to a homogenous liquid where the metal is present as a metal salt or metal complex. Alternatively or additionally, the metal complex inks may have metal particles or flakes suspended therein and the sizes of such particles may be no larger than 10 nanometers and may be distributed substantially randomly throughout a liquid of the ink. In some embodiments, a plurality of inkjet print heads 244 are used to apply a metal complex ink (or different metal complex inks) to different areas of the substrate (e.g., areas where a security feature is desired and/or an area where the micro-replication lacquer has already been applied).

The uncured metal complex ink(s) is applied to the substrate in a layer having a substantially uniform thickness. By applying the metal complex ink in a substantially uniform layer, the metal complex ink is allowed to conform to the cured micro-replicated lacquer, thereby creating a conformal layer of metal complex ink. It should be appreciated that the layer of metal complex ink may be completely conformal to the features created by the cured micro-replicated lacquer, partially conformal to the features created by the cured micro-replicated lacquer, or interrupted with features created by the micro-replicated lacquer. The application of the metal complex ink by the inkjet print heads corresponds to one of many possible application methods. Other methods which may be used to apply the metal complex ink include, without limitation, flexographic application methods, slot coating application methods, micro-gravure application methods, etc. Indeed, any methods suitable to apply the metal complex ink to the web-based substrate can be used without departing from the scope of the present disclosure.

The substrate having the uncured metal complex ink 220 is quickly passed to an ink curing station 248. In the ink cure station 248, the metal complex ink 220 is exposed to environmental conditions that cause the metal complex ink to cure. In some embodiments, the ink cure station 248 is positioned substantially adjacent to the inkjet print head(s) 244 such that the metal complex ink is cure within a predetermined amount of time of application to the substrate. More specifically, a quick curing of the metal complex ink is desirable to help achieve a mirror-like finish with the layer of metal complex ink and to help ensure that the layer at least substantially conforms to the micro-replication lacquer. In some embodiments, the ink cure station 248 exposes the metal complex ink to IR light within 1-10 seconds and no more than 12 seconds of being applied to the substrate. In some embodiments, the metal complex ink may be cured using a combination of IR light and/or hot air drying heads that force hot and dry air onto the metal complex ink. This curing process substantially transforms the metal complex ink into a metal layer. For instance, a silver complex ink may be substantially transformed to a layer of silver having a substantially uniform thickness and a mirror-like finish. These features enable the cured metal layer to have a mirror like finish and reflect the holographic structures and other security-related properties.

At this point the substrate having the cured metal complex ink 224 may be subjected to one or more additional processes 252 to ultimately result in the creation of one or many secure documents 228. In some embodiments, the substrate (in a web-based format) having the cured metal complex ink 224 is cut into sheets and those sheets are collated with other printed sheets, other electronic components (e.g., antennas, IC chips, etc.), protective overlay sheets, and the like. These additional sheets of material and electronic components may then be laminated together under application of heat and pressure.

The laminated sheets may then further be singulated or have individual secure documents cut therefrom. Thus, the production process can output a plurality of secure documents from a single sheet of material.

Figure 3A:
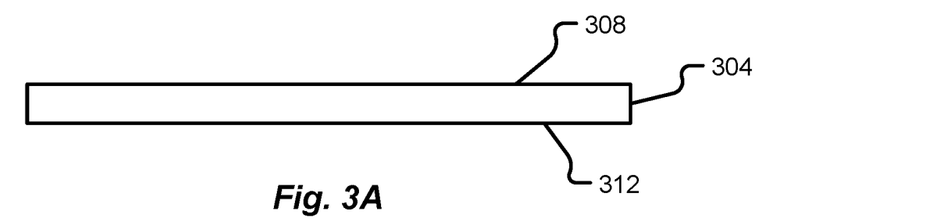
FIG. 3A is a cross-sectional view of a substrate used during production of a secure document in accordance with at least some embodiments of the present disclosure.

With reference now to FIGS. 3A-I, the construction of a secure document or components thereof will be described in accordance with at least some embodiments of the present disclosure. With reference initially to FIG. 3A, a substrate 304 is shown to include a first side 308 and an opposing second side 312. Although the substrate 304 is shown to have first and second ends connecting the first and second sides 308, 312, it should be appreciated that the substrate 304 is provided in a web-based format, a roll, a sheet, or the like such that the distance between the ends of the substrate 304 is significantly smaller than the length of the sides 308, 312. Said another way, the substrate 304 may be relatively thin even though FIG. 3A depicts the substrate 304 as having a significant thickness. Side 308 must be a highly polished or very fine textured finish if micro structure is to be micro replicated into the substrate.

In some embodiments, the substrate 304 corresponds to a layer of polycarbonate a PC copolymer or a blend of polycarbonate and a polycarbonate copolymer. More specifically, the substrate 304 may correspond to one or more of: bis phenyl a polycarbonate, a bisphenyl a polycarbonate copolymer, a bisphenyl a polycarbonate, and/or a copolymer blend. The substrate 304 may have a thickness between approximately 50 microns and 75 microns. The thickness of the substrate 304 may depend, at least in part, upon the desired final thickness of the security document to be made with the substrate 304.

Figure 3B:
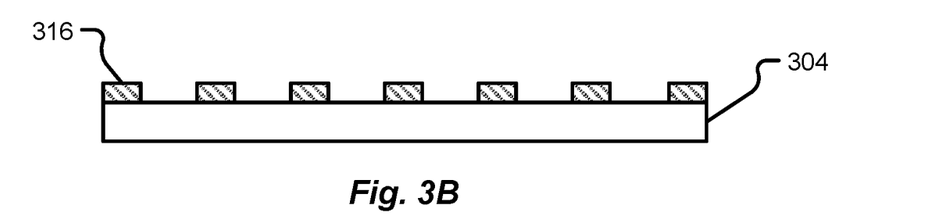
FIG. 3B is a cross-sectional view of a first layered structure used to produce a secure document in accordance with at least some embodiments of the present disclosure.

FIG. 3B depicts the substrate 304 having a micro replicated lacquer 316 applied thereto. More specifically, the micro replicated lacquer 316 may be applied to the first side 308 of the substrate 304. Although not depicted, it should be appreciated that the micro-replication lacquer 316 may alternatively or additionally be applied to the second side 312 of the substrate 304 without departing from the scope of the present disclosure. The micro-replicated lacquer 316 may have any number of possible formats or designs provided thereon. The depiction of the micro replicated lacquer 316 as corresponding to a plurality of uniform ridges that are evenly spaced apart is for ease of discussion and clarity.

Figure 3C:
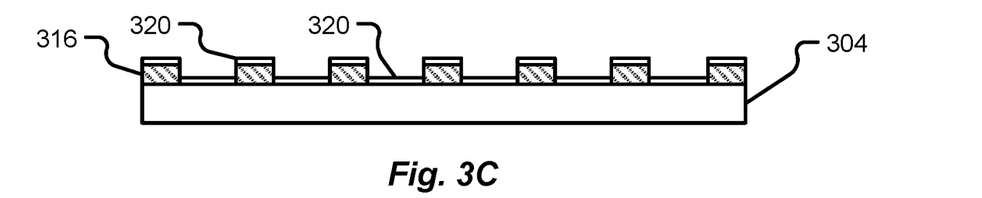
FIG. 3C is a cross-sectional view of a second layered structure used to produce a secure document in accordance with at least some embodiments of the present disclosure.
Figure 3D:
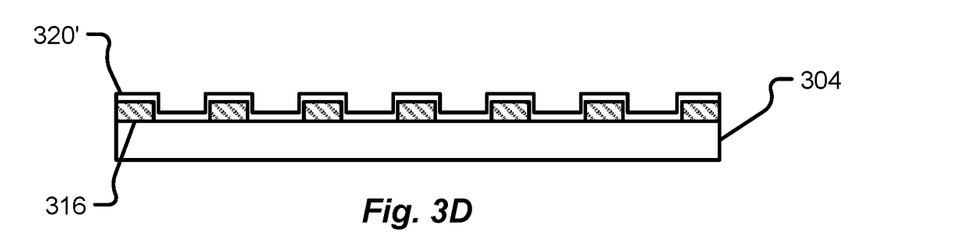
FIG. 3D is a cross-sectional view of an alternative format of the second layered structure depicted in FIG. 3C.
Figure 3E:
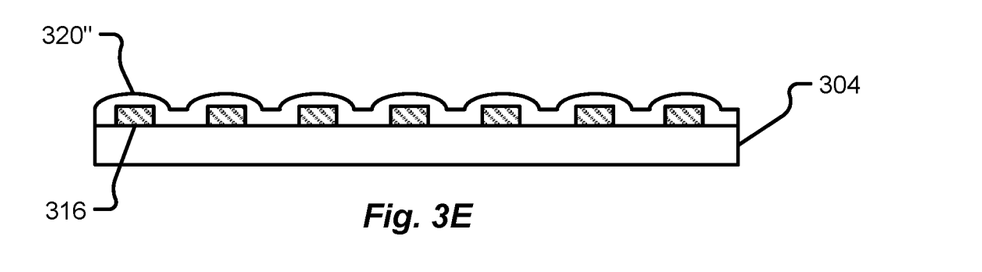
FIG. 3E is a cross-sectional view of an alternative format of the second layered structure depicted in FIG. 3C.

FIGS. 3C-E depict various possible intermediate products that can be realized by applying a metal complex layer 320, 320', 320" to the first side 308 of the substrate 304 over the raised features created by the micro-replication 316. In particular, FIG. 3C shows a first configuration where the metal complex ink 320 is applied in a relatively uniform thickness across the first side 308 of the substrate 304. It can be seen that the thickness of the metal complex ink 320 is less than a thickness of a feature created by the micro-replication lacquer 316. For instance, the metal complex ink 320 may be applied to have a thickness between 0.3 and 5 microns and the features created by the micro-replication lacquer 316 may have a thickness between 2 and 10 microns. Thus, at least some side portions of the features created by the micro-replication lacquer 316 may not be covered by the metal complex ink 320. Rather, the top surfaces of the features created by the micro-replication lacquer 316 and the exposed portions of the first side 308 of the substrate 304 may be uniformly covered with the metal complex ink 320. On the other hand, at least some portions of the features created by the micro-replication lacquer 316 (e.g., vertical walls, inclines, etc.) may not be covered with the metal complex ink 320.

FIG. 3D depicts an alternative configuration where the metal complex ink 320' is applied uniformly across the micro-replication lacquer 316 and the first side 308 of the substrate 304. In this example, the entirety of the features created by the micro-replication lacquer 316 is covered by the metal complex ink 320'. The thickness of the metal complex ink 320' may be similar to that depicted and described in connection with FIG. 3C; however, the metal complex ink 320' may be applied in a thick enough layer to maintain the layer thickness between the peaks and valleys of the features created by the micro-replication lacquer 316. When cured appropriately, this particular configuration may help to create a holographic feature with the metal complex ink substantially conforming to the features created by the micro-replication lacquer 316.

FIG. 3E depicts another alternative configuration where the metal complex ink 320" is conformally applied to the substrate 304 and micro-replication lacquer 316, but is thicker in the valleys between the features created by the micro-replication lacquer 316 than the peaks created by the micro-replication lacquer 316. This particular configuration still presents the metal complex ink 320" in substantial conformity with the micro-replication lacquer 316 as shown in FIG. 3D. However, the metal complex ink 320" in this configuration is not completely uniform in its thickness. The features created by the micro-replication lacquer 316 still create the contours in the metal complex ink 320" and will, therefore, contribute to the appearance of the security features resulting from the metal complex ink 320". An advantage to this particular configuration is that the application of additional layers to the first side 308 of the substrate may be easier to accommodate as compared to other configurations where the micro-replication features create a less smooth surface for lamination.

Figure 3F:
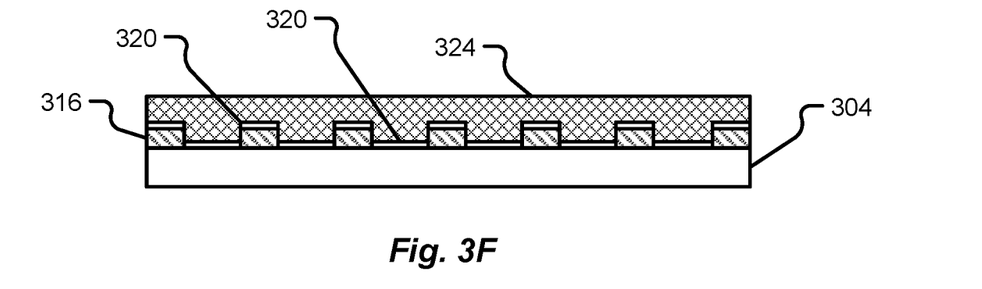
FIG. 3F is a cross-sectional view of a third layered structure used to produce a secure document in accordance with at least some embodiments of the present disclosure.
Figure 3G:
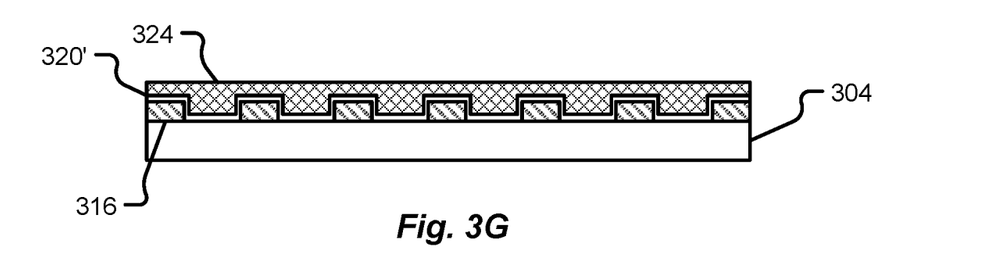
FIG. 3G is a cross-sectional view of an alternative format of the third layered structure depicted in FIG. 3F.
Figure 3H:
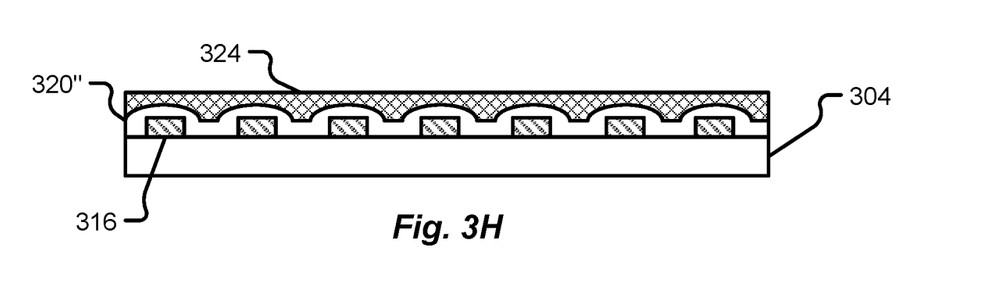
FIG. 3H is a cross-sectional view of an alternative format of the third layered structure depicted in FIG. 3F.

FIGS. 3F-H depicts further possible intermediate products that can be realized with the intermediate products of FIGS. C-E. In particular, FIG. 3F shows an intermediate product created by applying at least one additional layer 324 to the intermediate product of FIG. 3C. In some embodiments, at least the one additional layer 324 may correspond to an additional PC layer. Alternatively or additionally, other materials may be used for the additional layer 324. For instance, clear or semi-transparent plastics such at PET, PVC, PMMA etc. may be used for the at least one additional layer 324. FIG. 3G shows an intermediate product against created with at least one additional layer 324 applied to the intermediate product of FIG. 3D. FIG. 3H shows an intermediate product created with at least one additional layer 324 applied to the intermediate product of FIG. 3E. It should be appreciated that more than one additional layer may be applied to the substrate 304 having the metal complex ink cured thereon.

Figure 3I:
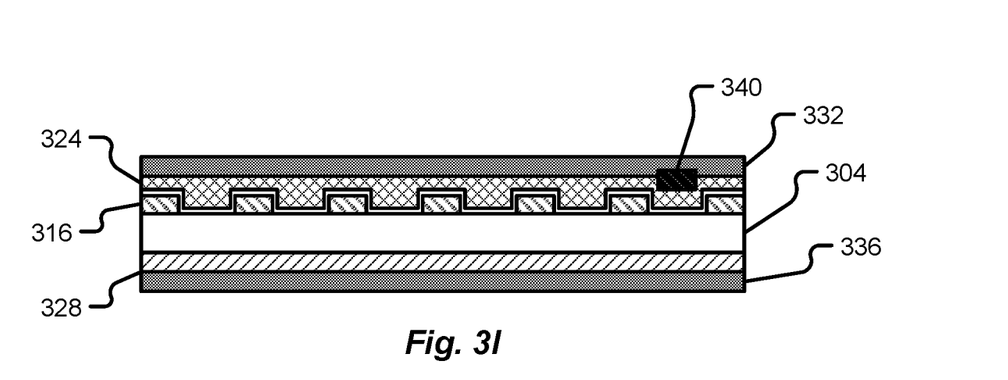
FIG. 3I is a cross-sectional view of a portion of an illustrative secure document in accordance with at least some embodiments of the present disclosure.

FIG. 3I depicts an illustrative secure document having the construction similar to FIG. 3G, but with more than one additional layer 324 and further with one or more electronic components 340 provided therein. Specifically, FIG. 3I shows a second additional layer 328 being provided adjacent to the second side 312 of the substrate. In this configuration, the substrate 304 is sandwiched between additional layer 324 and the second additional layer 328. More than two additional layers may further be applied to the stack of layers. For instance, a third additional layer 332 and fourth additional layer 336 may also be provided to the stack of layers and all of these layers of materials may be laminated together to create a cohesive security document.

The electronic component(s) 340 is also shown as being incorporated into the stack of layers. The electronic component(s) 340 may correspond to one or more of an IC chip, an antenna, an electrical trace, etc. Although the electronic component 340 is depicted as being in contact with the metal complex layer 324, it should be appreciated that it may be desirable to separate the electronic component 340 from the metal complex layer 324 so as to avoid interference between the conductive elements. As is known in the art, the electronic component 340 may be incorporated into the stack of layers using lamination techniques. Alternatively or additionally, one or more recesses or reliefs may be formed in an additional layer to accommodate the electronic component 340 and to avoid an undesirable bump around the electronic component 340. One or both of the outermost additional layers may correspond to a laserable material or similar type of material that can be laser-engraved or having ink applied thereto during a personalization process. As a non-limiting example, the outermost additional layers may include PC or a similar type of polymer.

Figure 4:
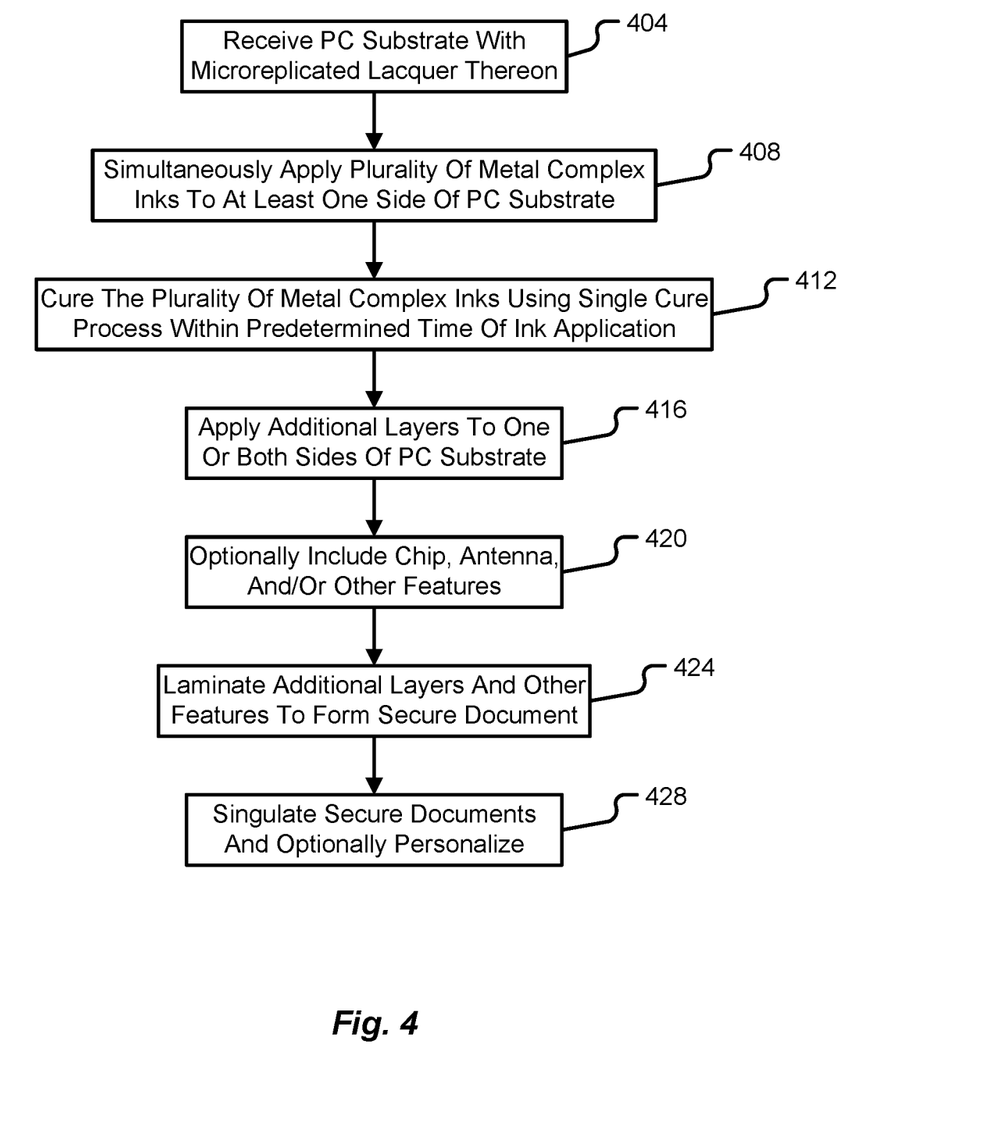
FIG. 4 is a flow chart depicting a method of producing a secure document with a plurality of metal complex inks in accordance with at least some embodiments of the present disclosure.

With reference now to FIG. 4, another method of manufacturing a secure document will be described in accordance with at least some embodiments of the present disclosure. The method begins when a PC substrate with a micro replicated lacquer provided thereon is received (step 404). The micro replicated lacquer is bonded onto the substrate during the curing process. The cured lacquer may cover a portion or the entire area of the substrate.

The method continues with the application of a plurality of different metal complex inks to at least one side of the PC substrate (step 408). In some embodiments, the plurality of different metal complex inks are applied to the side of the substrate having the micro-replication lacquer formed thereon. In some embodiments, a first of the plurality of metal complex inks may correspond to a silver complex ink whereas a second of the plurality of metal complex inks may correspond to a gold or copper complex ink. Alternatively or additionally, both metal complex inks may correspond to a silver complex ink, but with different solvents or liquid formulations. For example, one of the metal complex inks may have an alcohol or ester solvent whereas another of the metal complex inks may have ketones or glycol ethers as a solvent. Furthermore, the different metal complex inks may be applied to the substrate polymer and the micro-replication lacquer with different inkjet print heads. Thus, the different metal complex inks may be applied side-by-side or adjacent to one another, thereby creating a difference in optical characteristics from one metal complex ink to the next metal complex ink. The metal complex inks may be applied with a small (e.g., less than 5 micron) gap provided there between. Alternatively, a small amount of overlap between the metal complex inks may be tolerated. The existence of gaps or the lack thereof may depend upon the resolution of the inkjet print heads and the viscosity of the metal complex ink.

Because the metal complex inks are applied at substantially the same time, it may be possible to cure all of the different metal complex inks with a common curing process (step 412). In particular, the method continues by exposing the substrate with the different metal complex inks applied thereto to a common curing process within a predetermined amount of time of the application of such metal complex inks. As a non-limiting example, the metal complex inks may be exposed to UV light and/or heated air within 1-10 seconds of being applied to the substrate. This relatively quick application of a curing process helps to create a mirror-like finish for the metal complex ink.

The method continues with the application of one or more additional layers to one or both sides of the substrate (step 416). The method may also include providing one or more electronic components to the tack of layers created by the PC substrate and the additional layers (step 420). The additional layers and/or electronic component(s) may then be laminated together with the application of heat and/or pressure to create a desired laminated stack for a secure document (step 424).

If the laminated stack is provided in a sheet or roll format, the method may further include singulating or cutting individual secure documents from the sheet or roll (step 428). Additional personalization steps may then be performed in which the outermost layers of the secure document are either laser engraved or printed with colored ink(s).

While the flowcharts have been discussed and illustrated in relation to a particular sequence of events, it should be appreciated that changes, additions, and omissions to this sequence can occur without materially affecting the operation of the disclosed embodiments, configuration, and aspects.

What is claimed is:

1. A method of manufacturing a secure document, comprising:
   receiving a substrate in a roll format having a micro-replication lacquer applied to a first side of the substrate, the micro-replication lacquer comprising one or more features of a first thickness formed therein;
   applying a substantially uniform thickness, less than the first thickness, of metal complex ink to the first side of the substrate thereby covering the micro-replication lacquer applied to the first side of the substrate; and
   curing the metal complex ink within a predetermined amount of time of applying the metal complex ink to the first side of the substrate such that the applied metal complex ink substantially conforms to the micro-replication lacquer.

2. The method of claim 1, further comprising:
   applying a second layer to a second side of the substrate that opposes the first side of the substrate;
   covering the metal complex ink with a third layer thereby sandwiching the substrate between the second layer and the third layer; and
   laminating the substrate, second layer, and third layer.

3. The method of claim 2, wherein the metal complex ink comprises a lower curing temperature than the substrate, the second layer, and the third layer.

4. The method of claim 1, wherein the metal complex ink comprises particles having a diameter of no more than 10 nanometers.

5. The method of claim 4, wherein the metal complex ink comprises a thickness of no more than 4 microns and wherein the metal complex ink is cured to create a mirror-like finish.

6. The method of claim 1, wherein applying the metal complex ink to the first side of the substrate comprises printing the metal complex ink onto the first side of the substrate using one or more inkjet print heads.

7. The method of claim 1, further comprising:
   applying a second metal complex ink to the first side of the substrate, wherein the second metal complex ink is applied at substantially the same time as the metal complex ink.

8. The method of claim 7, wherein the second metal complex ink comprises a different material than is provided in the metal complex ink.

9. The method of claim 7, wherein the metal complex ink is applied with a first inkjet print head and the second metal complex ink is applied with a second inkjet print head.

10. The method of claim 1, wherein the metal complex ink is cured by exposure to at least one of Ultraviolet (UV) light and Infrared (IR) light.

11. The method of claim 1, further comprising:
    providing at least one electronic component over the substrate;
    covering the at least one electronic component with an additional layer of polycarbonate; and
    laminating the additional layer of the polycarbonate to the substrate thereby fixing a position of the at least one electronic component between the substrate and the additional layer of polycarbonate.

12. A secure document, comprising:
    a substrate having a micro-replication lacquer applied to a first side of the substrate, the micro-replication lacquer comprising one or more features of a first thickness formed therein; and
    a substantially uniform thickness, less than the first thickness, of metal complex ink applied to the first side of the substrate thereby covering the micro-replication lacquer applied to the first side of the substrate;
    wherein the metal complex ink is cured within a predetermined amount of time of application to the substrate such that the applied metal complex ink substantially conforms to the micro-replication lacquer; and
    wherein the metal complex ink comprises a lower curing temperature than the substrate.

13. The secure document of claim 12, wherein the metal complex ink is cured so as to exhibit a mirror-like finish.

14. The secure document of claim 12, wherein the metal complex ink comprises a silver nanoparticle ink and wherein the substrate comprises at least one of polycarbonate, polycarbonate copolymer, and a blend of polycarbonate and polycarbonate copolymer.

15. The secure document of claim 12, further comprising:
    a second layer positioned adjacent to a second side of the substrate that opposes the first side of the substrate; and
    a third layer positioned adjacent to the metal complex ink thereby sandwiching the substrate between the second layer and the third layer.

16. The secure document of claim 12, further comprising:
    a second metal complex ink applied adjacent to the metal complex ink.

17. A secure document, comprising:
    a polycarbonate substrate;
    an embossed lacquer provided on at least one surface of the polycarbonate substrate, the embossed lacquer comprising one or more features of a first thickness formed therein; and
    a security feature provided on the polycarbonate substrate, wherein the security feature at least partially conforms to the embossed lacquer and comprises a first metal complex ink as well as a second metal complex ink printed on the polycarbonate substrate in a layer having a substantially uniform thickness, less than the first thickness, and cured within a predetermined amount of time of printing on the substrate, wherein the first metal complex ink and the second metal complex ink are positioned adjacent to one another thereby creating different visual effects for the security feature.

18. The secure document of claim 12, wherein the applied metal complex ink substantially conforms to the micro-replication lacquer such that contours of an upper surface of the micro-replication lacquer created by the one or more features formed in the micro-replication lacquer create corresponding contours in an upper surface of the applied metal complex ink.

19. The secure document of claim 12, wherein the applied metal complex ink substantially conforms to the micro-replication lacquer such that peaks and valleys of an upper surface of the micro-replication lacquer substantially translate to an upper surface of the applied metal complex ink.

20. The secure document of claim 12, wherein curing the metal complex ink within a predetermined amount of time of application to the substrate such that the applied metal complex ink substantially conforms to the micro-replication lacquer creates a mirror-like finish on the applied metal complex ink interrupted by the one or more features of the micro-replication lacquer.

* * * * *